(12) United States Patent
Sustrick

(10) Patent No.: US 12,539,342 B2
(45) Date of Patent: Feb. 3, 2026

(54) FLUID SYSTEM WITH INTEGRATED DISINFECTING OPTICS

(71) Applicant: Stephen J. Sustrick, Montara, CA (US)

(72) Inventor: Stephen J. Sustrick, Montara, CA (US)

( * ) Notice: Subject to any disclaimer, the term of this patent is extended or adjusted under 35 U.S.C. 154(b) by 824 days.

(21) Appl. No.: 17/736,788

(22) Filed: May 4, 2022

(65) Prior Publication Data

US 2022/0354977 A1    Nov. 10, 2022

Related U.S. Application Data

(60) Provisional application No. 63/183,765, filed on May 4, 2021.

(51) Int. Cl.
*A61L 2/10* (2006.01)
*A61L 2/26* (2006.01)

(52) U.S. Cl.
CPC .................. *A61L 2/10* (2013.01); *A61L 2/26* (2013.01); *A61L 2202/11* (2013.01); *A61L 2202/122* (2013.01); *A61L 2202/14* (2013.01)

(58) Field of Classification Search
CPC .......... A61L 2/10; A61L 2/26; A61L 2202/11; A61L 2202/122; A61L 2202/14; A61L 2209/111; A61L 9/20; C02F 2209/06; C02F 1/686; C02F 1/687; C02F 2301/043; C02F 1/32; C02F 2201/3228; C02F 2209/005

See application file for complete search history.

(56) References Cited

U.S. PATENT DOCUMENTS

| 2019/0070643 A1 * | 3/2019 | Wong ..................... B08B 9/0328 |
| 2021/0023250 A1 * | 1/2021 | Golkowski ............. C01B 15/01 |

FOREIGN PATENT DOCUMENTS

WO    WO-2015024094 A1 *   2/2015    ............... A61L 9/20

* cited by examiner

*Primary Examiner* — Sean E Conley
*Assistant Examiner* — Aham Lee
(74) *Attorney, Agent, or Firm* — Larry E. Henneman, Jr.; Henneman & Associates, PLC

(57) ABSTRACT

A fluid disinfecting system includes a fluid bath for soaking items to be disinfected, a fluid directing conduit, and a light source disposed adjacent the fluid directing conduit. The light source is operative to emit ultraviolet light into the fluid directing conduit, such that one or more cross sections of the fluid directing conduit are saturated with ultraviolet light. Any fluid passing through the fluid directing conduit is necessarily exposed to the ultraviolet light and thereby disinfected. The disinfected fluid is returned to the fluid bath, and the cycle continues.

14 Claims, 12 Drawing Sheets

FLUID SYSTEM WITH INTEGRATED DISINFECTING OPTICS

RELATED APPLICATIONS

This application claims the benefit of priority of U.S. Provisional Patent Application No. 63/183,765, filed on May 4, 2021 by the same inventor, and which is incorporated herein by reference in its entirety.

BACKGROUND

Field of the Invention

This invention relates generally to sterilization and/or disinfection of liquids, and more particularly to fluid systems that sterilize and/or disinfect a working fluid with radiation. This invention also relates to the sterilization and/or disinfection of objects with the working fluid.

Description of the Background Art

In many branches of healthcare and in water purification systems, it is important to neutralize pathogens in fluids to prevent the infection of a patient/user with dangerous pathogens. Many tools used in healthcare, especially dentistry, utilize water and/or air in various tools to increase safety or effectiveness. For example, many drills and syringes utilize high pressure air or water to clean out dental cavities in preparation for a filling. These instruments do not cut skin and minimize painful vibration in the patient's mouth. Tools of this sort require some form of fluid disinfectant, so as not to introduce harmful pathogens to the patient's body. The need for disinfection is even greater during oral surgery procedures.

Systems that utilize ultraviolet (UV) light to disinfect fluids are well known. Typically these systems include a pathway, through which fluid flow is directed, and a source of UV light. Some systems utilize light emitting diodes (LEDs) to shine UV light on a photo-catalytic material, in order to create free radicals, which degrade organic substances in the fluid. These systems are problematic, because adequately controlling the rate of creation and the path of travel of the free radicals is difficult. In addition, these systems necessarily waste energy in converting between UV light and free radicals, requiring extra power to sufficiently energize the LEDs.

Alternate systems utilize a fluid flow pathway and a UV light source, so as to directly irradiate the fluid in the pathway with ultraviolet light from the light source. These systems typically require a long, meandering pathway in order to haphazardly expose the water to a presumed sufficient amount of UV light. The extra length of these pathways requires extra expenses in the form of tubing, housing material, and/or design requirements. These systems also suffer from inadequate (or at least uncertain) exposure of pathogens to UV radiation, due to non-uniform coverage from the light source.

SUMMARY

What is needed is a system that is capable of directly and uniformly exposing a fluid supply to specified ranges of UV radiation in a controlled and directed manner at levels sufficient to confidently disinfect impurities in the fluid. What is also needed is a system that utilizes a straight fluid pathway, in order to reduce costs associated with tubing and other requirements of a long and meandering fluid pathway. What is also needed is a system and method for disinfecting tools and instruments.

Example systems and methods provide a means of cold disinfection for dental/medical instruments and/or other items. An item to be disinfected can be placed in a water (or other solvent) bath. The solvent can be agitated to dislodge pathogens from the item and suspend the pathogens in the solvent. The solvent can be circulated out of the bath, through a light disinfecting zone, through a filter, and back into the bath. In this manner, pathogens are removed from the item and destroyed.

An example disinfecting system includes a reservoir, a first port, a second port, a fluid conduit, a pump, and an ultraviolet (UV) light source. The reservoir defines an interior space configured to hold a volume of the working fluid and to facilitate the exposure of objects in the interior space to the working fluid. The first and second fluid ports are in fluid communication with the interior space of the reservoir. The fluid conduit is coupled between the first port and the second port to direct the working fluid along a fluid path. The pump can be coupled to the fluid conduit and configured to circulate the working fluid along the fluid path, through the fluid conduit and through the reservoir. The ultraviolet light source can be configured to irradiate the working fluid as the working fluid traverses a particular section of the fluid conduit.

Example disinfecting systems can additionally include a filter disposed in the fluid path. The filter can be disposed between the particular section of the fluid conduit (where the UV light is delivered) and the pump.

Example disinfecting systems can additionally include an agitator. The agitator can be coupled to at least one of the reservoir and the fluid conduit. The agitator can induce turbulence into the working fluid of the system.

Example disinfecting systems can additionally include optics. The optics can be disposed between the ultraviolet light source and the particular section of the fluid conduit. The optics can shape and intensify a beam of UV light, and direct the intensified beam across the fluid path of the working fluid.

Example disinfecting systems can additionally include an additive dispenser. The additive dispenser can be coupled to at least one of the reservoir and the circulation line. The additive dispenser can be configured to dispense one or more additives into the working fluid.

Example disinfecting systems can additionally include a monitor. The monitor can be configured to acquire information associated with a current state of the fluid turbidity, transmissivity, temperature, pH, and so on). The additive dispenser can be operative to administer one are more additives into the working fluid according to the information acquired by the monitor.

In an example disinfecting system, the system can configured to operate in a forward flow state and a reverse flow state. The fluid enters the reservoir through the first port and exits the reservoir through the second port when the system is operating in the forward flow state. The fluid enters the reservoir through the second port and exits the fluid reservoir through the first port when the system is operating in the reverse flow state. The pump can be a reversible pump configured to pump the fluid in a forward direction when the system is in the forward flow state and to pump the fluid in a reverse direction when the system is in the reverse flow state. The example disinfecting system can additionally include a first filter assembly and a second filter assembly. The first filter assembly can include a first filter. The first filter assembly can be disposed in the fluid path at a first location when the fluid is moving along the fluid path into the reservoir through the first port and out of the reservoir through the second port. The second filter assembly can include a second filter. The second filter assembly can be disposed in the fluid path at a second location when the fluid is moving along the fluid path into the reservoir through the second port and out of the reservoir through the first port.

In an example disinfecting system, the first filter assembly and the second filter assembly can be switchable between a filtering state and an open state. The first filter assembly can be disposed in the fluid path when the first filter assembly is in the filtering state, and the first filter can be disposed out of the fluid path when the first filter assembly is in the open state. Similarly, the second filter can be disposed in the first fluid path when the second filter assembly is in the filtering state, and the second filter can be disposed out of the first fluid path when the second filter assembly is in the open state.

In a particular example disinfecting system, the first filter assembly can be disposed between the first port and the pump. The first filter assembly can be in the filtering state when the working fluid is moving in a forward flow direction. In the forward flow direction the working fluid enters the reservoir via the first port and exits the reservoir via the second port. The first filter assembly can be in the open state when the working fluid is moving in a reverse flow direction. In the reverse flow direction the working fluid enters the reservoir via the second port and exits the reservoir via the first port. The second filter assembly can be disposed between the second port and the pump. The second filter assembly can be in the open state when the working fluid is moving in the forward flow direction, and the second filter assembly can be in the filtering state when the working fluid is moving in the reverse flow direction.

In a more particular example disinfecting system, the first port can be disposed at a first vertical height, and the second port can be disposed at a second vertical height. The second vertical height (e.g., near the bottom of the reservoir) can be lower than the first vertical height (e.g., near the top of the reservoir). The working fluid can flow downwardly through the reservoir in the forward flow direction, and the working fluid can flow upwardly through the reservoir in the reverse flow direction.

Example disinfecting systems can additionally include a controller electrically connected to the pump and/or the light source. The controller can be configured to control the operation of the pump and/or the light source. The example systems can additionally include an additive dispenser. The additive dispenser can be coupled to deliver one or more additives to at least one of the reservoir and the fluid conduit. The additive dispenser can be electrically connected to receive control signals from the controller, and the additive dispenser can be configured to dispense one or more additives into the working fluid according to the control signals from the controller. The example disinfecting systems can additionally include a monitor. The monitor can coupled to monitor a current state of the working fluid. The monitor can also be electrically connected to the controller and operative to provide information indicative of the current state of the working fluid to the controller. The controller can be configured to cause the additive dispenser to administer one are more additives into the working fluid according to the information received from the monitor. The example disinfecting systems can additionally include an agitator coupled to at least one of the reservoir and the circulation line. The agitator can be electrically connected to receive control signals from the controller.

Methods for disinfecting objects are also disclosed. An example method of disinfecting objects with fluid includes providing a fluid reservoir. The fluid reservoir can have a first port and a second port. The first port can be coupled to the second port by a fluid conduit. The reservoir, the first port, the second port, and the fluid conduit define a fluid path. The example method additionally includes placing an object into the reservoir and placing a quantity of fluid into the reservoir. The example method additionally includes circulating the fluid along the fluid path and subjecting the fluid to radiation at a killing zone along the fluid path. The example method can additionally include filtering the fluid exposed to the radiation before the fluid exposed to the radiation is returned to the reservoir.

In example methods, the killing zone can be disposed outside of the reservoir. The killing zone can include a UV light source and optics. The optics can be configured to shape UV light from the UV light source into a uniform beam and to direct the uniform beam across a complete cross section of the fluid path. The uniform beam can have an intensity and a dimension measured along a direction of the fluid path. The intensity and the dimension can be sufficient to ensure that pathogens traversing the beam at a particular flow rate of the fluid will receive a lethal dose of the UV radiation.

BRIEF DESCRIPTION OF THE DRAWINGS

The present invention is described with reference to the following drawings, wherein like reference numbers denote substantially similar elements.

DETAILED DESCRIPTION

Systems and methods described herein overcome some problems associated with the prior art, by directly and uniformly subjecting pathogens in a fluid to ultraviolet (UV) radiation from sources disposed on and around a straight fluid pathway. Systems and methods for disinfecting objects using a circulating fluid bath and UV radiation to disinfect the fluid are also disclosed. In the following description, numerous specific details are set forth (e.g., utilization of laser diode and/or LED light sources) in order to provide a thorough understanding of the invention. Those skilled in the art will recognize, however, that the invention may be practiced apart from these specific details. In other instances, details of well-known disinfecting practices (e.g., routine calibration, optimization, and so on) and components have been omitted, so as not to unnecessarily obscure the present invention.

Figure 1:
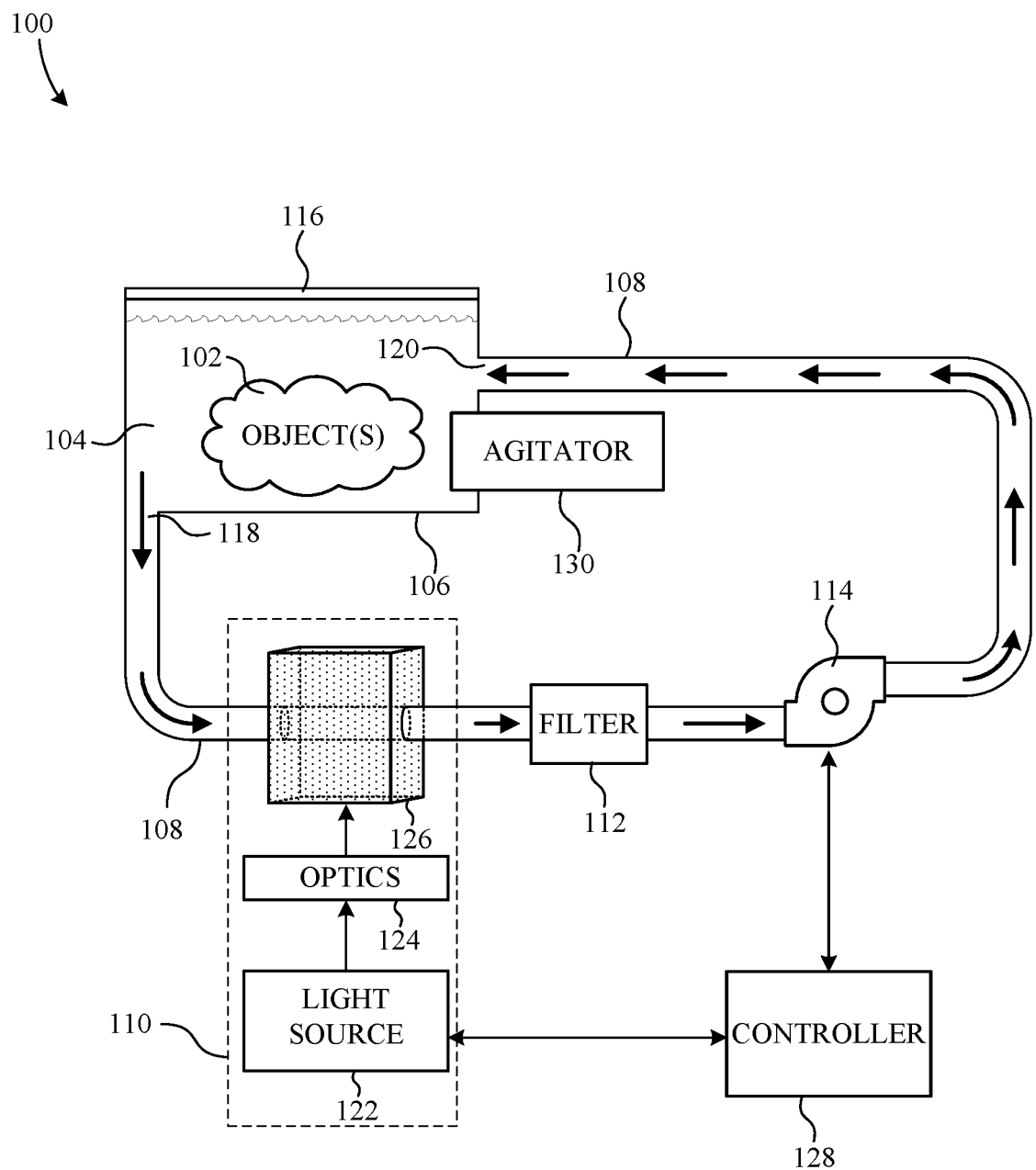
FIG. 1 is a diagram of an example disinfecting system.

FIG. 1 shows an example disinfecting system 100. System 100 is a closed loop system that disinfects objects 102 by continuously flowing disinfected fluid 104 around them. System 100 includes a reservoir 106, a circulation line 108, a UV radiator 110, a filter 112, and a fluid pump 114. Reservoir 106 is configured to hold fluid 104 and objects 102 submerged therein. Furthermore, reservoir 106 includes a lid 116, an outlet port 118, and an inlet port 120. Lid 116 allows objects 102 and fluid 104 to be placed into, and removed from, reservoir 106. UV radiator 110 includes a light source 122 and optics 124. Light source 122 provides disinfecting light to optics 124, which then manipulate (e.g., diverge, converge, collimate, etc.) the light into a three-dimensional geometric light zone 126 through which line 108 passes. Light zone 126 is shown representationally in FIG. 1, but several examples of particular disinfecting chambers (e.g., alternate "light zones") are described hereinafter.

The operation of system 100 is summarized as follows. When pump 114 is actuated, fluid 104 from inside reservoir 106 is drawn into line 108 through port 118. Fluid 104 then passes through light zone 126 thereby disinfecting fluid 104. At least a section of line 108 passing through light zone 126 is light permissive such that any fluid that passes through light zone 126 is exposed to disinfecting light. Then, the disinfected fluid 104 passes through filter 112 to prevent particulates from obstructing pump 114. Finally, the disinfected fluid 104 passes through pump 114 and is returned to reservoir 106, through port 120. As long as pump 114 is actuated, fluid 104 continuously cycles through reservoir 106 and line 108 and, therefore, continuously disinfects objects 102. Optionally, system 100 may include a controller 128 that facilities the coordination and control of light source 122 and/or pump 114. For example, the actuation, cycle frequency and timing of actuation, and/or power/intensity settings of light source 122 and pump 114 may be controlled by controller 128. Of course, such settings can be adjusted either manually or automatically per application requirements.

As an alternate option, system 100 may include an agitator 130 (e.g., ultrasonic agitator assembly, electric motor driven vibrator, etc.) coupled to reservoir 106 to mechanically dislodge particulates from object 102 and/or other various locations in system 100 where particulates may be lodged and prevented from freely circulating around system 100. Optionally, agitator 130 may be inserted entirely or at least partially into fluid 104 at any location within system 100. As yet another option, agitator 130 may be coupled to the exterior of any component of system 100 such as, for example, circulation line 108, reservoir 106, etc.

Light source 122 can be any light source capable of providing UV light at the desired frequency and intensity. Example light sources can include, but are not limited to, LEDs, laser diodes, lasers, fiber optics transmitting UV light from a laser, and so on.

Figure 2:
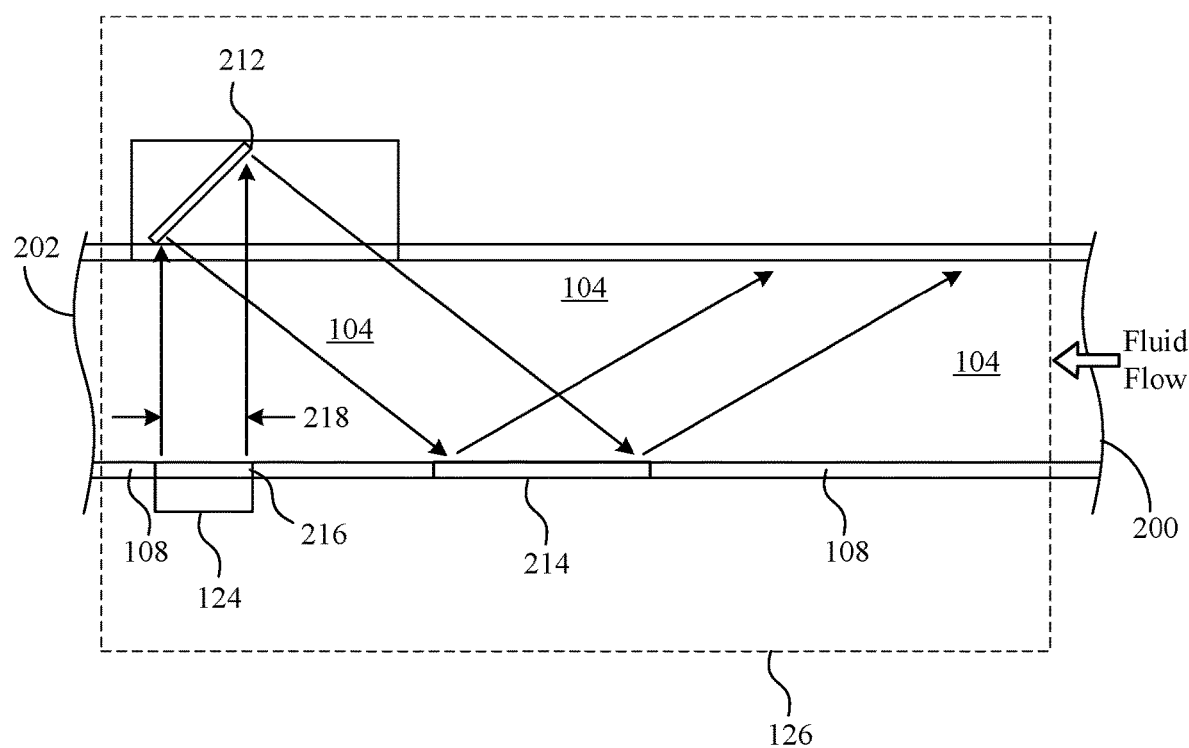
FIG. 2 shows a particular example of a light zone of the disinfecting system of FIG. 1.

FIG. 2 shows a side view of circulation line 108 passing through light zone 126, shown representationally in FIG. 1. Fluid 104 flows in from a first side 200 of light zone 126 and out from a second side 202 of light zone 126. Optics 124 forms and directs UV light from light source 122 (FIG. 1) to create a concentrated, uniform, directed beam 218 of UV light and directs the beam 218 into circulation line 108, through clear window 216, and across the path of fluid 104. Beam 218 is at least as wide as circulation line 108, so that any fluid 104 passing from first side 200 to second side 202 of light zone 126 must necessarily traverse beam 218. In this manner, any pathogens suspended in fluid 104 are exposed to a known, predetermined amount of UV light, sufficient to disinfect fluid 104 to an acceptable extent. Moreover, to the extent that the flow of fluid 104 is sufficiently laminar, each pathogen will be exposed to approximately the same amount of UV light as it passes through beam 218. This approach provides a significant improvement in efficiency, with respect to prior art systems, because light is not "wasted" by repeatedly irradiating the same pathogens (i.e., unnecessary overkill) or by over radiating zones of a chamber that have low or inconsistent fluid flow therethrough.

Optionally, beam 218 can be directed toward an angled reflective surface 212. Reflective surface 212 reflects UV light beam 218 on an angle toward a flat reflective surface 214, which directs beam 218 further into circulation line 108, increasing the number of times pathogens must traverse beam 218, thereby increasing the number of pathogens that are neutralized and/or reducing the required power.

Increased efficiency can also be achieved by coordinating the geometries of beam 218 and the portion of fluid conduit 108 passing through light zone 126. In a particular example, the relevant portion of fluid conduit 108 has a rectangular cross section, and beam 218 has the shape of a rectangular solid, which completely fills the rectangular cross section of fluid conduit 108.

Figure 3:
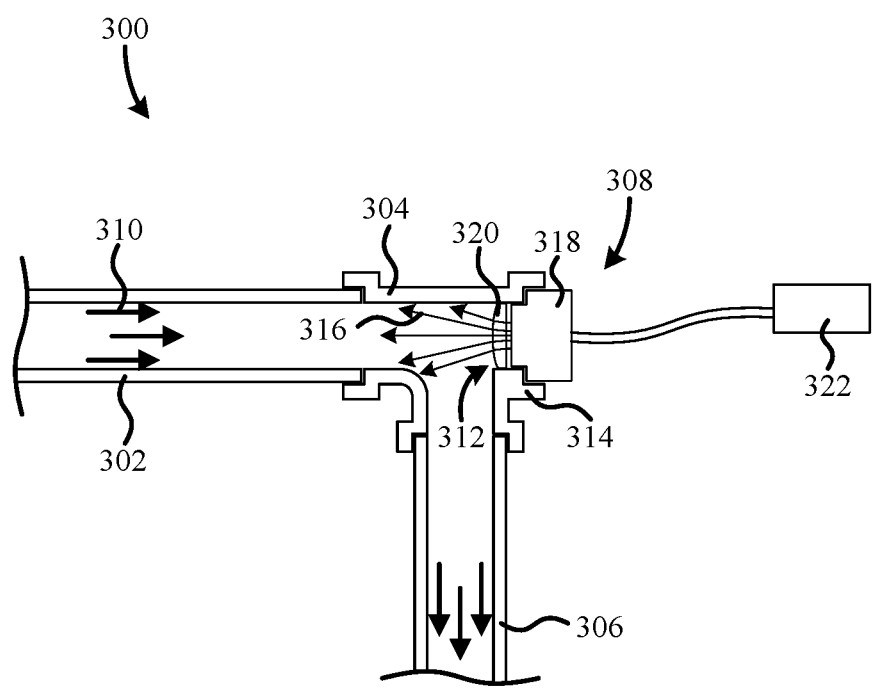
FIG. 3 shows a cross-sectional side view of an alternate disinfecting chamber.

FIG. 3 shows a cross sectional side view of another disinfecting chamber 300, including an inlet conduit 302, a housing 304, an outlet conduit 306, and a light source assembly 308. Inlet conduit 302 is directly coupled to housing 304 to supply fluid 310 thereto. Housing 304 is coupled between inlet conduit 302 and outlet conduit 306 such that fluid 310 flowing through outlet conduit 308 must first flow through housing 304. As shown, housing 304 includes a window 312 through which light can pass but fluid cannot. Furthermore, housing 304 defines a light source receiving feature 314 that facilitates the mounting of light source assembly 308 to housing 304. Light source assembly 308 is seated in light source receiving feature 314 at a 90 degree bend in the fluid path to radiate divergent light 316 (e.g., a cone of light) to be repeatedly reflected down along inlet conduit 302. The light is simultaneously radiated across an entire plane normal to the flow direction of fluid 310, such that all fluid 310 passing through outlet conduit 306 must first traverse divergent light 316. In the example embodiment, light source assembly 308 includes a laser diode 318 and an optical assembly 320. Laser diode 318 is operative to convert electricity from a power source 322 into UV light that is then diverged by optical assembly 320. Optical assembly 320 is, for example, a lens disposed in window 314.

Figure 4:
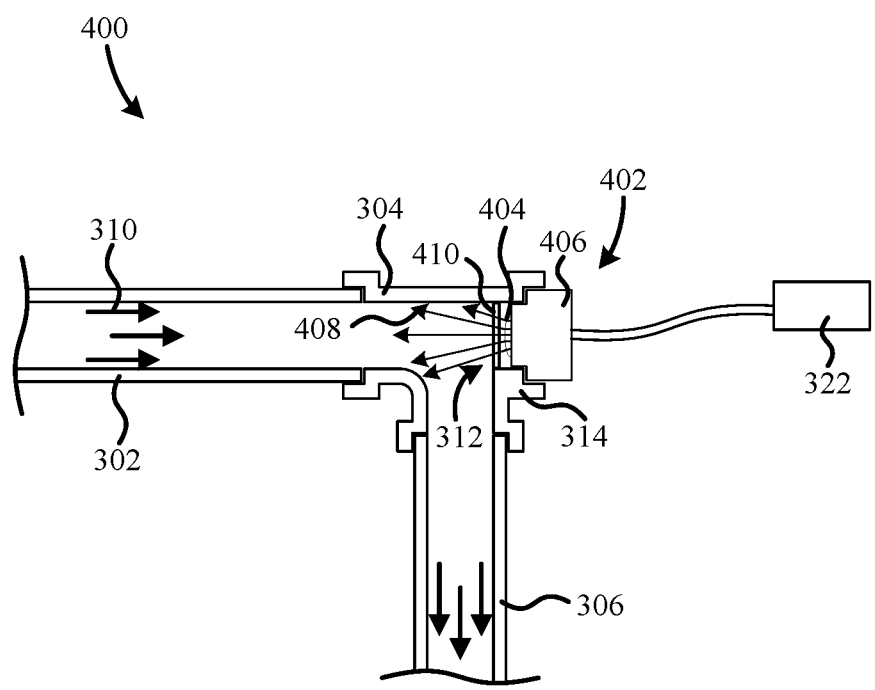
FIG. 4 shows a cross-sectional side view of another alternate disinfecting chamber.

FIG. 4 shows a cross sectional side view of another example disinfecting chamber 400. Disinfecting chamber 400 is substantially similar to disinfecting chamber 300, except that light source assembly 308 is substituted with an alternate light source assembly 402 wherein optics 404 are an integral part of the light source 406 rather than being separate components. Therefore, the components of chamber 400 that are substantially identical to those of chamber 300 are denoted by like reference numbers and withheld from the following description to avoid redundancy. Like optics 320, optics 404 diverge the UV light and direct the light into chamber 400 such that all fluid that passes through housing chamber 400 gets exposed to diverging light 408. A transparent plate 410 is fixed and sealed in housing 304 over in window 312 to prevent fluid from passing through window 312 while still allowing light to pass therethrough. In the example embodiment, light source 406 is a laser diode package with integral diverging optics 404.

Figure 5:
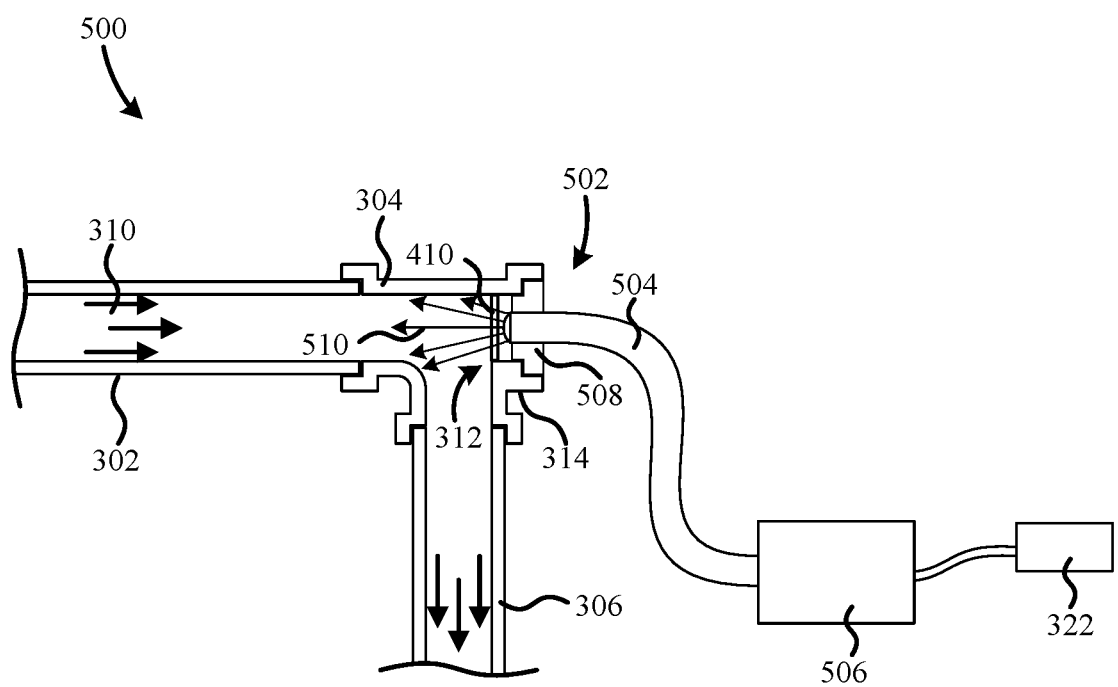
FIG. 5 shows a cross-sectional side view of yet another alternate disinfecting chamber.

FIG. 5 shows a cross sectional side view of another example disinfecting chamber 500. Disinfecting chamber 500 is also substantially similar to disinfecting chamber 300. Therefore, the components of chamber 500 that are substantially identical to those of chamber 300 are denoted by like reference numbers and withheld from the following description to avoid redundancy. One difference between chambers 500 and 300 is that light source assembly 308 is replaced with an alternate light source assembly 502. That is, the optics 320 and light source 318 are replaced by a fiber optic cable 504 and laser light source 506, respectively. To accommodate for this substitution, a retainer 508 is used to mount the end of fiber optic cable 504 in light source receiving feature 314 of housing 304. Alternatively, the need for retainer 508 could be eliminated by modifying feature 314 of housing 304 to directly receive the end of fiber optic cable 504. Like optics 320 and light source 314, fiber optic cable 504 and laser light source 506 are configured to output divergent light 510 (e.g., a cone of light) over an entire cross section of the fluid path such that all fluid that passes through housing chamber 500 gets exposed to divergent light 510.

Figure 6:
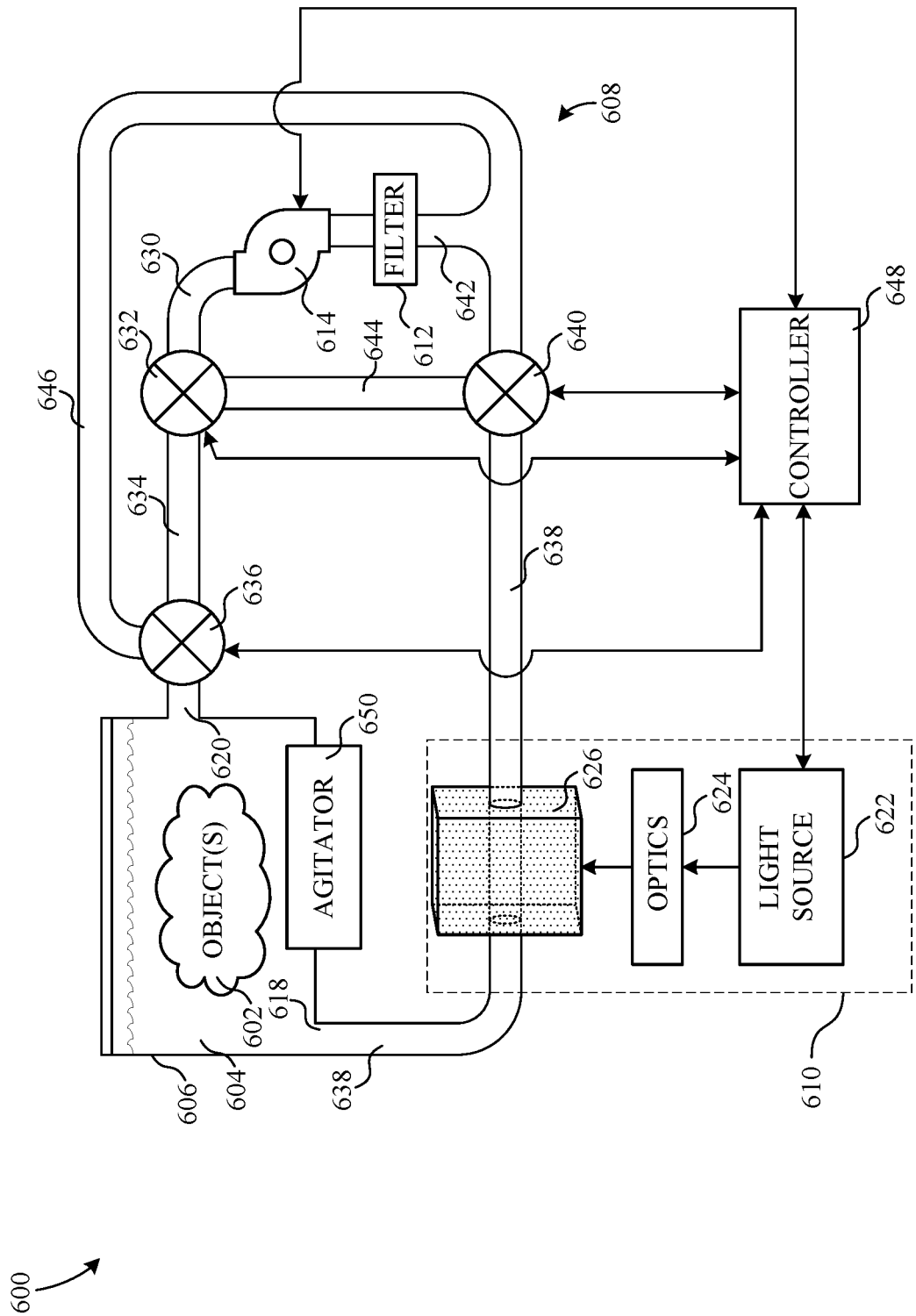
FIG. 6 is a diagram of another example disinfecting system.

FIG. 6 shows another example disinfecting system 600. System 600 is a closed loop system that disinfects objects 602 by continuously flowing disinfected fluid 604 around them in both a forward flow direction and a reverse flow direction. System 600 includes a reservoir 606, a variable path plumbing assembly 608, a UV radiator 610, a filter 612, and a fluid pump 614.

Reservoir 606 is configured to hold fluid 604 and objects 602 submerged therein. Furthermore, reservoir 606 includes a lid 616, an outlet port 618, and an inlet port 620. Lid 616 allows objects 602 and fluid 604 to be placed into, and removed from, reservoir 606.

Variable path plumbing assembly 608 includes various conduits and valves that are, together, configured to carry fluid 604 through multiple different closed loop paths according to whatever operating position the valves are in. Assembly 608 includes a first line 630, a first valve 632, a second line 634, a second valve 636, a third line 638, a third valve 640, a fourth line 642, a fifth line 644, and a sixth line 646. Line 630 is configured to carry fluid 604 from pump 614 to valve 632. Valve 632 is configured to switch between a first position wherein fluid from line 630 is directed to line 634 and a second position wherein fluid from line 630 directed to line 644. Line 634 is configured to direct fluid from valve 632 to valve 636 when valve 632 is in a first position. Valve 636 is configured to switch between a first position wherein fluid from line 634 is directed to port 620 of reservoir 606 and a second position wherein fluid from port 620 of reservoir 606 is directed to line 646. Line 638 is configured to direct fluid between port 618 and valve 640, passing through UV radiator 610. Valve 640 is configured to switch between a first position wherein fluid from line 638 is directed to line 642 and a second position wherein fluid from line 644 is directed to line 642. Line 642 is configured to direct fluid through filter 612 to pump 614. Line 644 is configured to direct fluid from valve 632 to valve 640 when valves 632 and 640 are both in the second position. Line 646 is configured to direct fluid from valve 636 to line 642 when valve 636 is in the second position.

UV radiator 610 includes a light source 622 and optics 624. Light source 622 provides disinfecting light to optics 624, which then manipulate (e.g., diverge, converge, collimate, etc.) the light into a three-dimensional geometric light zone 626 through a line 628 of assembly 608 passes. Light zone 626 is shown representationally in FIG. 1, but several examples of particular disinfecting chambers (e.g., alternate "light zones") are described in the disclosure. Light source 622 can be any light source capable of providing UV light at the desired frequency and intensity. Example light sources can include, but are not limited to, LEDs, laser diodes, lasers, fiber optics transmitting UV light from a laser, and so on.

Filter 612 is configured to collect particulates from fluid 604 passing through line 642 that may otherwise obstruct pump 614 and/or any other part of system 600.

Pump 614 is configured to circulate fluid 604 through system 100. In this example, pump 614 is a variable flow-rate pump but may optionally be a fixed flow rate pump.

Optionally, system 600 may include a controller 648 that facilities the coordination and control of pump 614, light source 622, and/or valves 632, 634, and 640. For example, the actuation, cycle frequency and timing of actuation, and/or power/intensity settings of light source 622 and pump 614 may be controlled by controller 648. Of course, such settings can be adjusted either manually or automatically per application requirements. As another example, the operating positions of valves 632, 634, and 640 may be controlled by controller 648. In such a case, valves 632, 634, and 640 would be electromechanical valves, each automatically switchable between a first operating position and a second operating position. Otherwise, valves 632, 634, and 640 may be manual valves.

As an alternate option, system 600 may include an agitator 650 (e.g., ultrasonic agitator assembly, electric motor driven vibrator, etc.) coupled to reservoir 606 to mechanically release particulates from objects 602 and/or other various locations in system 600 where particulates may be lodged and prevented from freely circulating around system 600. Optionally, agitator 650 may be inserted entirely or at least partially into fluid 604 at any location within system 600. As yet another option, agitator 650 may be coupled to the exterior of any component of system 600 such as, for example, circulation lines 630, 634, 638, 642, 644, 646, reservoir 606, etc.

Figure 7A:
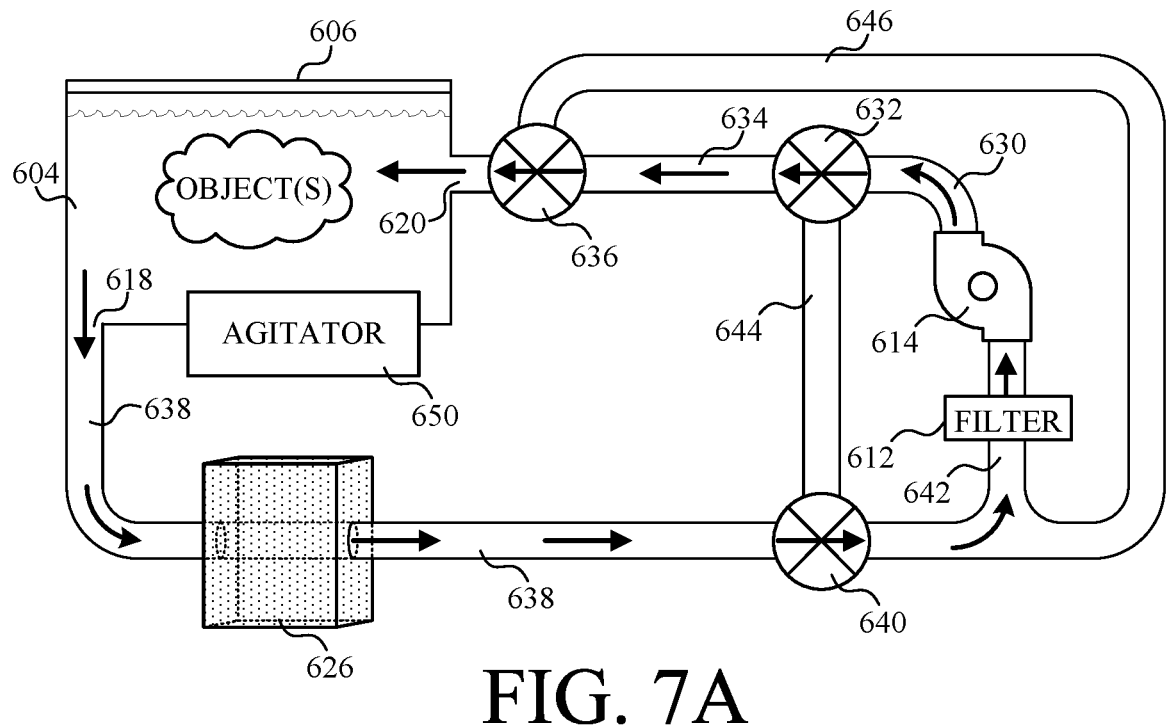
FIG. 7A shows the system of FIG. 6 in a forward flow state.
Figure 7B:
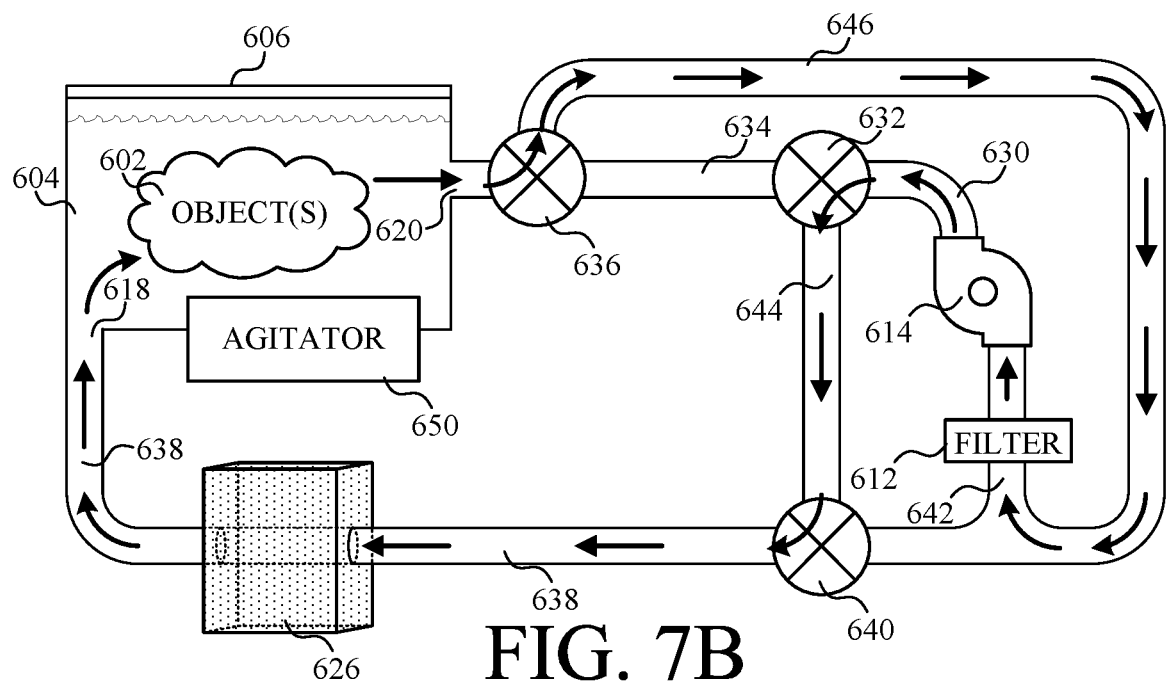
FIG. 7B shows the system of FIG. 6 in a reverse flow state.

FIGS. 7A and 7B illustrate the flow of fluid 604 through system 600 when valves 632, 636, and 640 are all in a first position and when valves 632, 636, and 640 are all in a second position, respectively. As shown, the fluid flow direction is illustrated with heavy arrows.

As shown in FIG. 7A, when valves 632, 636, and 640 are all in the first position, fluid 604 flows out of pump 614, through line 630, and into valve 632. Fluid 604 from valve 632 is then directed to line 634 and into valve 636. Fluid 604 from valve 636 is then directed into reservoir 606 through port 620. As fluid 604 flows over objects 602, it dislodges and picks up particulates (e.g., debris, organisms, etc.). Unsterilized, dirty fluid 604 then flows out of reservoir 604 through port 618, and into line 638. As fluid 604 passes through line 638, it passes through light zone 626, thereby killing potentially harmful organisms suspended therein. The disinfected fluid then continues through line 638 to valve 640 where it is directed to line 642. As the disinfected fluid 604 passes through line 642, it passes through filter 612 and back into pump 614. As long as pump 614 is on, fluid 604 repeatedly continues through the aforementioned path until either pump 614 is turned off or the operating positions of valves 632, 636, and 640 are changed. Of course, the longer pump 614 runs, the more fluid 604 is disinfected and circulated and, therefore, the greater the level of disinfection for objects 602.

As shown in FIG. 7B, when valves 632, 636, and 640 are all in the second position, fluid 604 flows out of pump 614, through line 630, and into valve 632. Fluid 604 from valve 632 is then directed to line 644 and into valve 640. Fluid 604 from valve 640 is then directed to line 638 where it is carried through light zone 626, thereby killing potentially harmful organisms suspended therein. The disinfected fluid 604 then continues through line 638 to port 618 where it enters reservoir 606. As fluid 604 flows over objects 602, it dislodges and picks up particulates (e.g., debris, organisms, etc.). Contaminated, dirty fluid 604 then flows out of reservoir 60, through port 620, and into valve 636. Fluid 604 is then directed by valve 636 to line 646. Fluid 604 then continues through line 646 to line 642 where it passes through filter 612 and then re-enters pump 614. As long as pump 614 is on, fluid 604 repeatedly continues through the aforementioned path until either pump 614 is turned off, or the operating positions of valves 632, 636, and 640 are changed.

System 600 is configured to operate in a forward direction and a reverse direction when valves 632, 636, and 640 are in the first operating position and in the second operating position, respectively. Depending on the application, system 600 may transition between the forward flow direction and the reverse flow direction one or more times in a single disinfecting session. In the forward direction, fluid 604 passes over objects 602 from port 620 to port 618. In the reverse direction, fluid 604 passes over objects 602 from port 618 to port 620. By changing this flow direction, particulates and other contaminants are more likely to be dislodged from objects 602 as compared to a system only capable of a single flow direction. Of course, the more particulates and contaminants that are dislodged from objects 602, the more disinfected objects 602 become.

Figure 8:
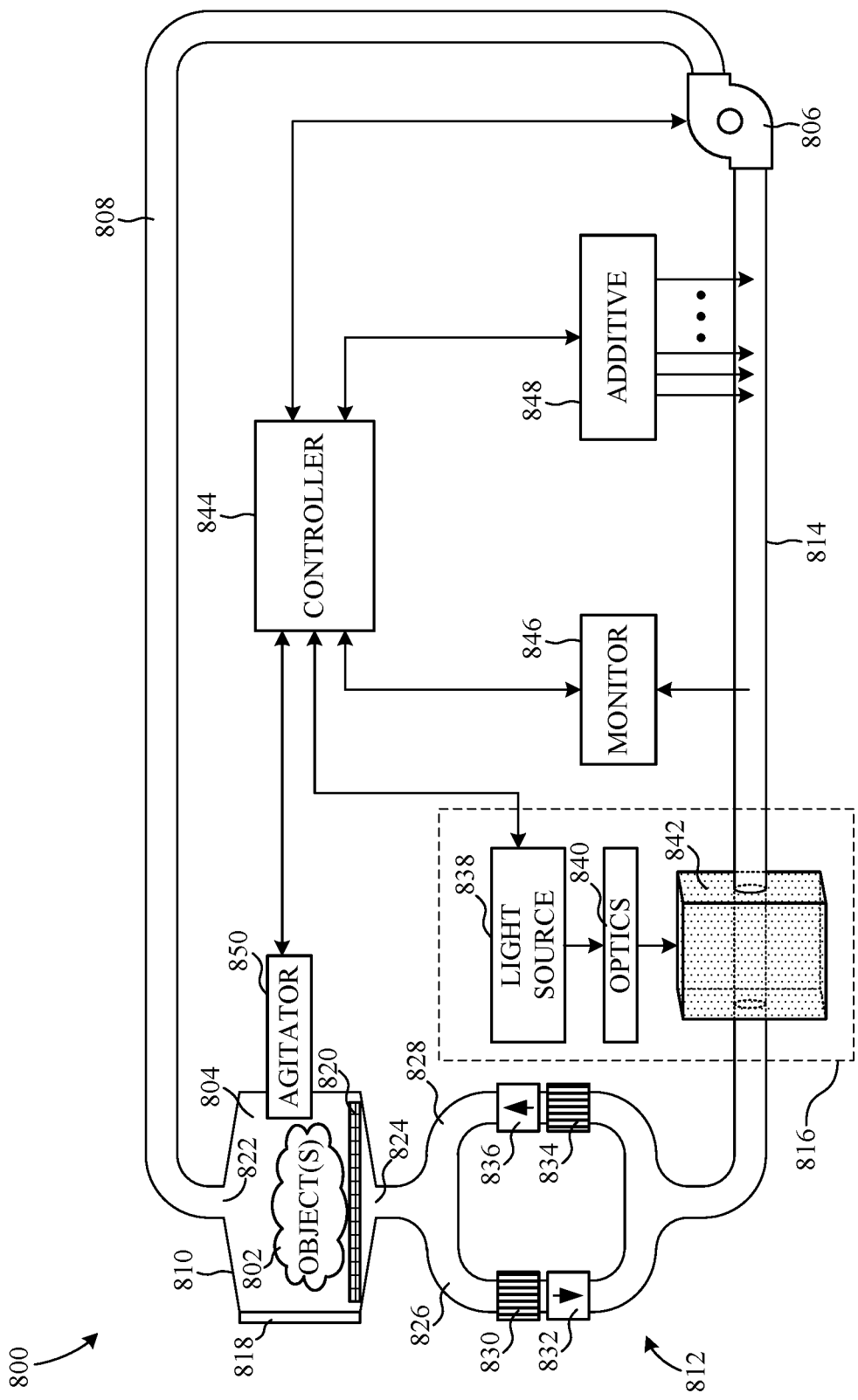
FIG. 8 is a diagram of yet another example disinfecting system.

FIG. 8 shows another example disinfecting system 800. System 800 is a closed loop system that disinfects objects 802 by continuously flowing disinfected fluid 804 around them. Like system 600, system 700 is also capable of reversing flow direction to better dislodge contaminants from objects 802.

System 800 includes a pump 806, a first circulation line 808, a reservoir 810, a filter assembly 812, a second circulation line 814, and a UV radiator 816.

Pump 806 is a reversible pump configured to pump fluid 804 in both a forward direction and a reverse direction. As shown, pump 806 is disposed between lines 808 and 812 such that when pump 806 is in the forward operating state, it pumps fluid 804 from line 812 to line 808. When pump 806 is in the reverse operating state, it pumps fluid 804 from line 808 to line 812.

Line 808 is connected to pump 806 and reservoir 810 and is configured to direct fluid 804 therebetween.

Reservoir 810 is configured to hold fluid 804 and objects 802 submerged therein. Furthermore, reservoir 810 includes a door 818, a rack 820, a first port 822, and a second port 824. Door 818 allows objects 802 to be placed into, and removed from, reservoir 810. Rack 820 is configured to support objects 802 while also allowing fluid 804 to pass through reservoir 810. Ports 822 and 824 are connected to lines 808 and 814, respectively, and facilitate the flow of fluid 804 into and out of reservoir 810. The orientation of reservoir 810 is such that fluid 804 flows vertically through reservoir 810.

Filter assembly 812 is connected between reservoir 810 and line 814 and is configured to filter forward flowing fluid 804 through a first channel 826 and reverse flowing fluid 804 through a second channel 828. First channel 826 includes a first filter 830 and a first check valve 832 and second channel 828 includes a second filter 834 and a second check valve 836. First check valve 832 permits the passage of fluid 804 therethrough when fluid 804 is flowing in the forward direction but closes when fluid 804 is flowing in the reverse direction. Oppositely, second check valve 836 permits the passage of fluid 804 therethrough when fluid 804 is flowing in the reverse direction but closes when fluid 804 is flowing in the forward direction. This configuration ensures fluid 804 only flows in one direction for each filter.

Line 814 is configured to direct fluid 804 between filter assembly 812 and pump 806. At least a portion of line 814 is light permissive such that UV light from light radiator 816 can pass through the walls of line 814 and contact contaminants that may be suspended in fluid 804.

UV radiator 816 includes a light source 838 and optics 840. Light source 838 provides disinfecting light to optics 840, which then manipulate (e.g., diverge, converge, collimate, etc.) the light into a three-dimensional geometric light zone 842 through which line 814 passes. Light zone 842 is shown representationally in FIG. 8, but several examples of particular disinfecting chambers (e.g., alternate "light zones") are described in the disclosure.

Optionally, system 800 may include a controller 844 that facilities the coordination and control of light source 838 and/or pump 806. For example, the actuation, cycle frequency and timing of actuation, and/or power/intensity settings of light source 838 and pump 806 may be controlled by controller 844. Controller 844 may also control the flow direction of pump 806. Such settings can be adjusted either manually or automatically per application requirements.

As another option, system 800 may include a fluid monitor 846 and an additive dispenser 848 connected to controller 844. Fluid monitor 846 includes one or more sensors that are connected to controller 844 for measuring the state (e.g., PH, chemical ppm of additives, etc.) of fluid 804. Depending on the measurement acquired by monitor 846, controller 844 instructs additive dispenser 848 to precisely dispense one or more additives into fluid 804. Such additives may include, but are not limited to, surfactants, chelating agents, acidic solutions, basic solutions, bactericides, anti-virals, and so on.

As yet another option, system 800 may include an agitator 850 (e.g., ultrasonic agitator assembly, electric motor driven vibrator, etc.) coupled to reservoir 810 to mechanically release particulates from objects 802 and/or other various locations in system 800 where particulates may be lodged and prevented from freely circulating around system 800. Optionally, agitator 850 may be inserted entirely or at least partially into fluid 804 at any location within system 800. As yet another option, agitator 850 may be coupled to the exterior of any component of system 800 such as, for example, line 808, line 814, reservoir 106, etc.

Figure 9A:
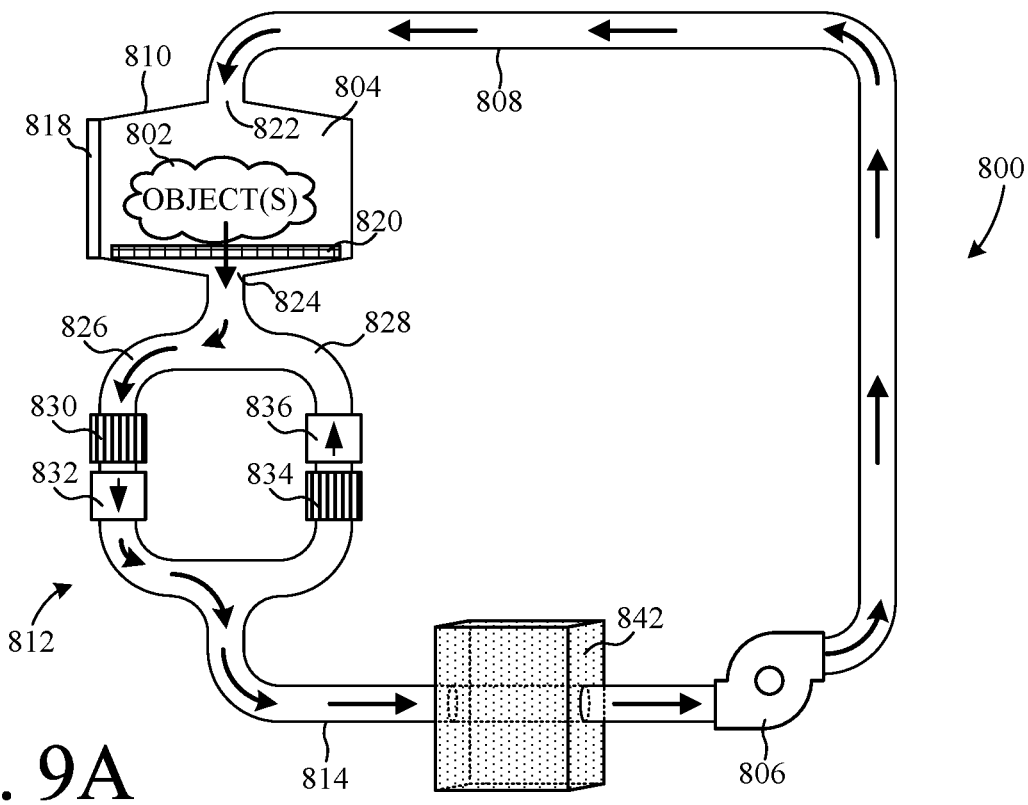
FIG. 9A is a diagram of the disinfecting system of FIG. 8 in a forward flow state.
Figure 9B:
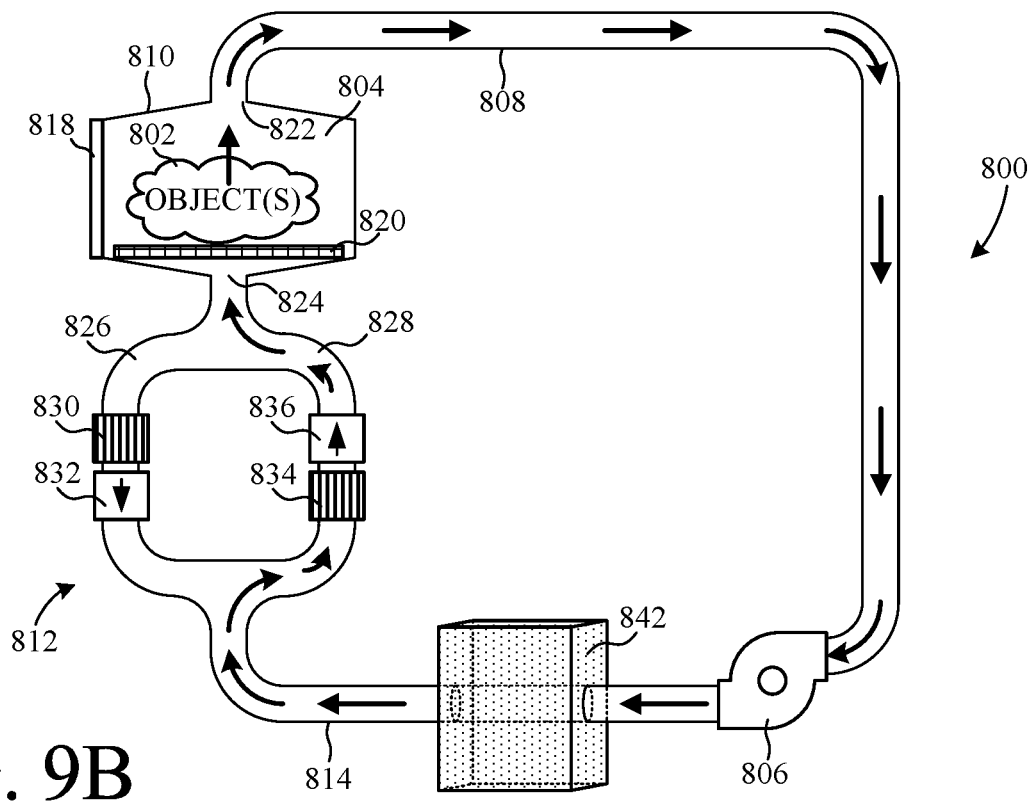
FIG. 9B is a diagram of the disinfecting system of FIG. 8 in a reverse flow state.

FIGS. 9A and 9B illustrate the flow of fluid 804 through system 800 when pump 806 is driven in a forward flow direction and a reverse flow direction, respectively. As shown, the fluid flow direction is illustrated with heavy arrows.

When pump 806 is actuated in a forward flow direction as shown in FIG. 9A, fluid 804 leaves pump 806 and flows into line 808. Fluid 804 continues through line 808 and then enters reservoir 810 through port 822. Fluid 804 passes over objects 802 and then exits reservoir 810 through port 824. Next, fluid 804 enters filter assembly 812 and is directed to channel 826 where it passes through filter 830 and check valve 832. Because pump 806 is pumping fluid 804 forward, check valve 836 is automatically in a closed position such that fluid 804 cannot pass through filter 834. After fluid 804 passes through filter 830 and check valve 832, it enters line 814 where it is carried through light zone 842, thereby killing any contaminants that may be present in fluid 804. The fluid 804 is then directed back to pump 806 where the cycle may be repeated, reversed, etc.

When pump 806 is actuated in a reverse flow direction as shown in FIG. 9B, fluid 804 leaves pump 806 and flows into line 814. Fluid 804 in line 814 is then carried through light zone 842, thereby killing any contaminants that may be present in fluid 804. Then, fluid 804 is directed to filter assembly 812 and is directed to channel 828 where it passes through filter 834 and check valve 836. Because pump 806 is pumping fluid 804 in reverse, check valve 832 is automatically in a closed position such that fluid 804 cannot pass through filter 830. Fluid 804 continues into reservoir 810 through port 824 and passes over objects 802 before leaving reservoir 810 through port 822. After fluid 804 leaves port 822, is directed back to pump 806 where the cycle may be repeated, reversed, etc.

Figure 10:
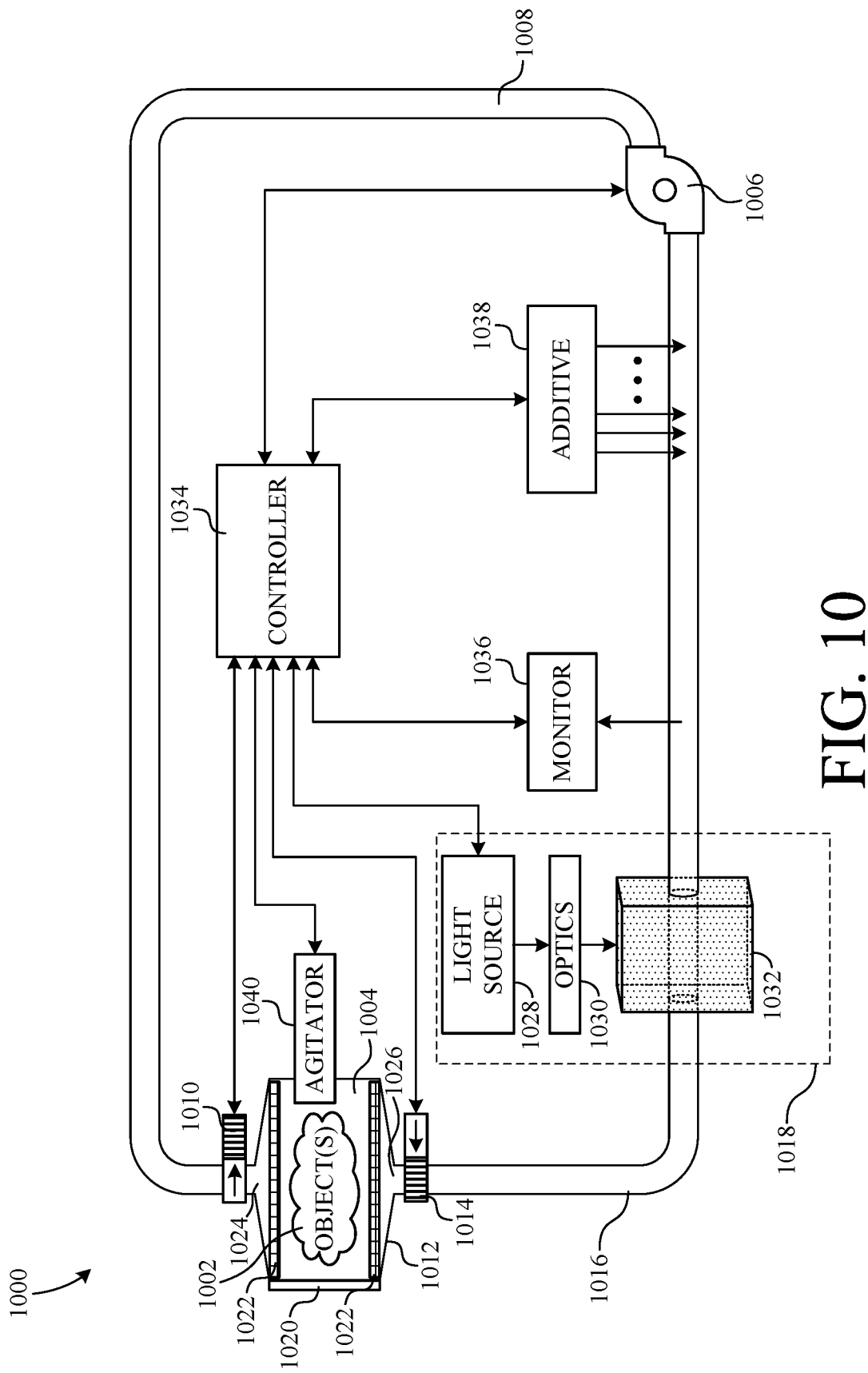
FIG. 10 is a diagram of yet another example disinfecting system.

FIG. 10 shows another example disinfecting system 1000. System 1000 is a closed loop system that disinfects objects 1002 by continuously flowing disinfected fluid 1004 around them. Like system 700 and 800, system 1000 is also capable of reversing flow direction to better dislodge contaminants from objects 1002.

System 1000 includes a pump 1006, a first circulation line 1008, a first filter 1010, a reservoir 1012, a second filter 1014, a second circulation line 1016, and a UV radiator 1018.

Pump 1006 is a reversible pump configured to pump fluid 1004 in both a forward direction and a reverse direction. As shown, pump 1006 is disposed between lines 1008 and 1016 such that when pump 1006 is in the forward operating state, it pumps fluid 1004 from line 1008 to line 1016. When pump 1006 is in the reverse operating state, it pumps fluid 1004 from line 1016 to line 1008.

Line 1008 is connected to pump 1006 and filter 1010 and is configured to direct fluid 1004 therebetween.

Filter 1010 is disposed between line 1008 and reservoir 1012 and is configured to switch between an operating position and an open position. When in the operating position, filter 1010 is disposed in the flow path of fluid 1004. When in the open position, filter 1010 is moved out of the flow path of fluid 1004. When pump 1006 is operating in the forward flow state, filter 1010 is in the open position such that it is not in the flow path of fluid 1004. When pump 1006 is operating in the reverse flow state, filter 1010 is switched to the operating position wherein it is disposed directly in the flow path of fluid 1004.

Reservoir 1012 is configured to hold fluid 1004 and objects 1002 submerged therein. Furthermore, reservoir 1012 includes a door 1020, two racks 1022, a first port 1024, and a second port 1026. Door 1020 allows objects 1002 to be placed into, and removed from, reservoir 1012. Racks 1022 are configured to support objects 1002 while also allowing fluid 1004 to pass through reservoir 1012. The orientation of reservoir 1012 is such that fluid 1004 flows vertically through reservoir 1012.

Filter 1014 is disposed between reservoir 1012 and line 1016 and is configured to switch between an operating position and an open position. When in the operating position, filter 1014 is disposed in the flow path of fluid 1004. When in the open position, filter 1014 is moved out of the flow path of fluid 1004. When pump 1006 is operating in the reverse flow state, filter 1014 is in the open position such that it is not in the flow path of fluid 1004. When pump 1006 is operating in the forward flow state, filter 1014 is switched to the operating position wherein it is disposed directly in the flow path of fluid 1004.

Line 1016 is configured to direct fluid 1004 between filter 814 and pump 806. At least a portion of line 1016 is light permissive such that UV light from light radiator 1018 can pass through the walls of line 1016 and contact contaminants that may be suspended in fluid 1004.

UV radiator 1018 includes a light source 1028 and optics 1030. Light source 1028 provides disinfecting light to optics 1030, which then manipulate (e.g., diverge, converge, collimate, etc.) the light into a three-dimensional geometric light zone 1032 through which line 1016 passes. Light zone 1032 is shown representationally in FIG. 10, but several examples of particular disinfecting chambers (e.g., alternate "light zones") are described in the disclosure.

Optionally, system 1000 may include a controller 1034 that facilities the coordination and control of light source 1028 and/or pump 1006. For example, the actuation, cycle frequency and timing of actuation, and/or power/intensity settings of light source 1028 and pump 1006 may be controlled by controller 1034. Controller 1034 may also control the flow direction of pump 1006. Such setting can be adjusted either manually or automatically per application requirements.

As another option, system 1000 may include a fluid monitor 1036 and an additive dispenser 1038 connected to controller 1034. Fluid monitor 1036 includes one or more sensors that are connected to controller 1034 for measuring the state (e.g., PH, chemical ppm of additives, turbidity, and so on) of fluid 1004. Depending on the measurements acquired by monitor 1036, controller 1034 instructs additive dispenser 1038 to precisely dispense one or more additives into fluid 1004. Such additives may include, but are not limited to, surfactants, chelating agents, acidic solutions, basic solutions, bactericides, anti-virals, and so on.

As yet another option, system 1000 may include an agitator 1040 (e.g., ultrasonic agitator assembly, electric motor driven vibrator, etc.) coupled to reservoir 1012 to mechanically release particulates from objects 1002 and/or other various locations in system 1000 where particulates may be lodged and prevented from freely circulating around system 1000. Optionally, agitator 1040 may be inserted entirely or at least partially into fluid 1004 at any location within system 1000. As yet another option, agitator 1040 may be coupled to the exterior of any component of system 1000 such as, for example, line 1008, line 1016, reservoir 1012, etc.

Figure 11A:
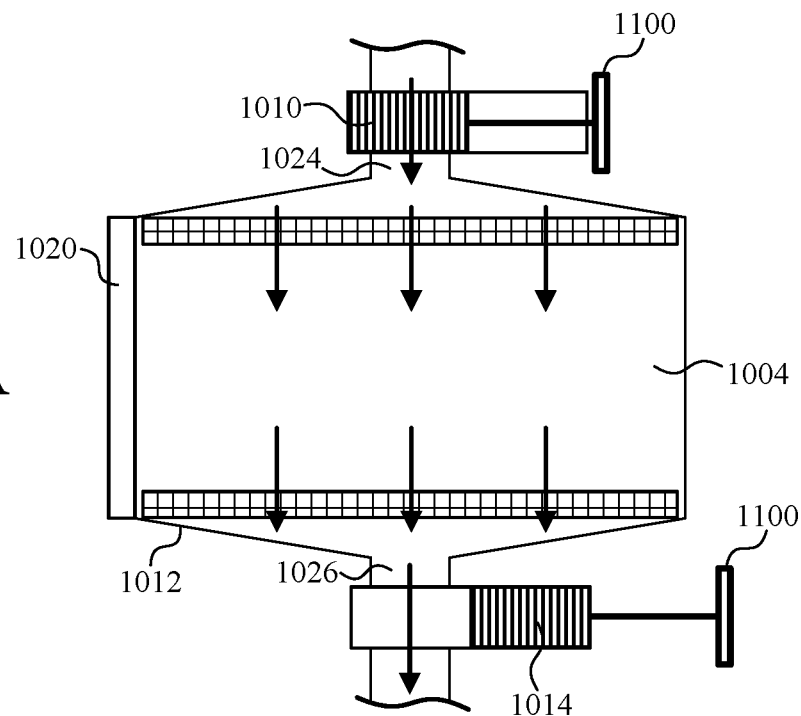
FIG. 11A is a side view of the reservoir of the system of FIG. 10 in a forward flow state.

FIG. 11A shows a side view of filter 1010, reservoir 1012, and filter 1014 when pump 1006 is operating in a forward flow state. In the forward flow state, filter 1010 is in the operating position wherein it is disposed in the flow path of fluid entering reservoir 1012 through port 1024 and filter 1014 is in the open position wherein it is out of the flow path of fluid 1004. Each of filters 1010 and 1014 may be switched between the operating state and the open state either electromechanically and/or mechanically. Optionally, each of filter 1010 and 1014 may include a handle 1100 for manually switching between the operating state and the open state by pushing handle 1100 and pulling handle 1100, respectively.

Figure 11B:
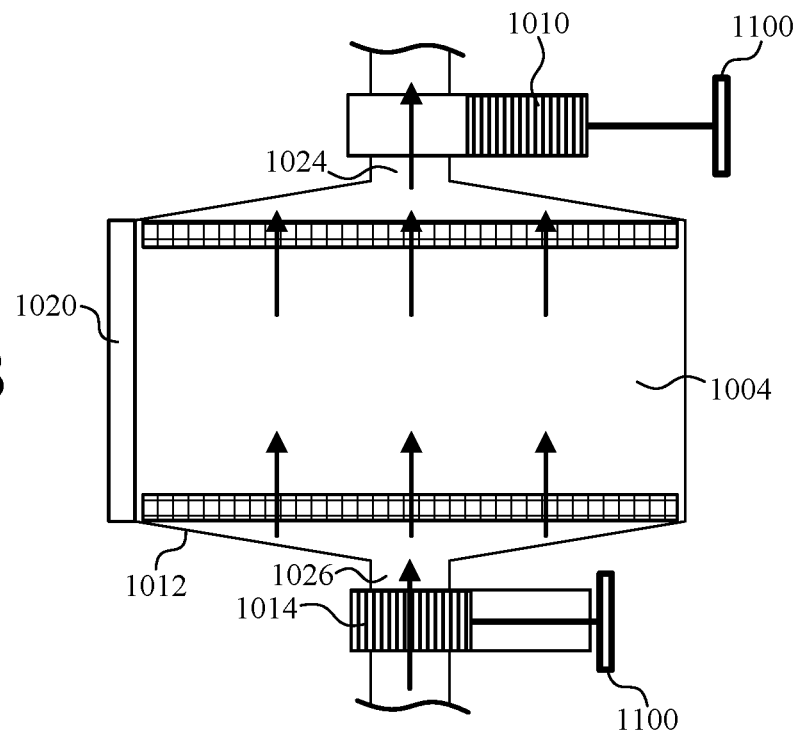
FIG. 11B is a side view of the reservoir of the system of FIG. 10 in a reverse flow state.

FIG. 11B shows a side view of filter 1010, reservoir 1012, and filter 1014 when pump 1006 is operating in a reverse flow state. In the reverse flow state, filter 1014 is in the operating position wherein it is disposed in the flow path of fluid entering reservoir 1012 through port 1026 and filter 1010 is in the open position wherein it is out of the flow path of fluid 1004.

Figure 12:
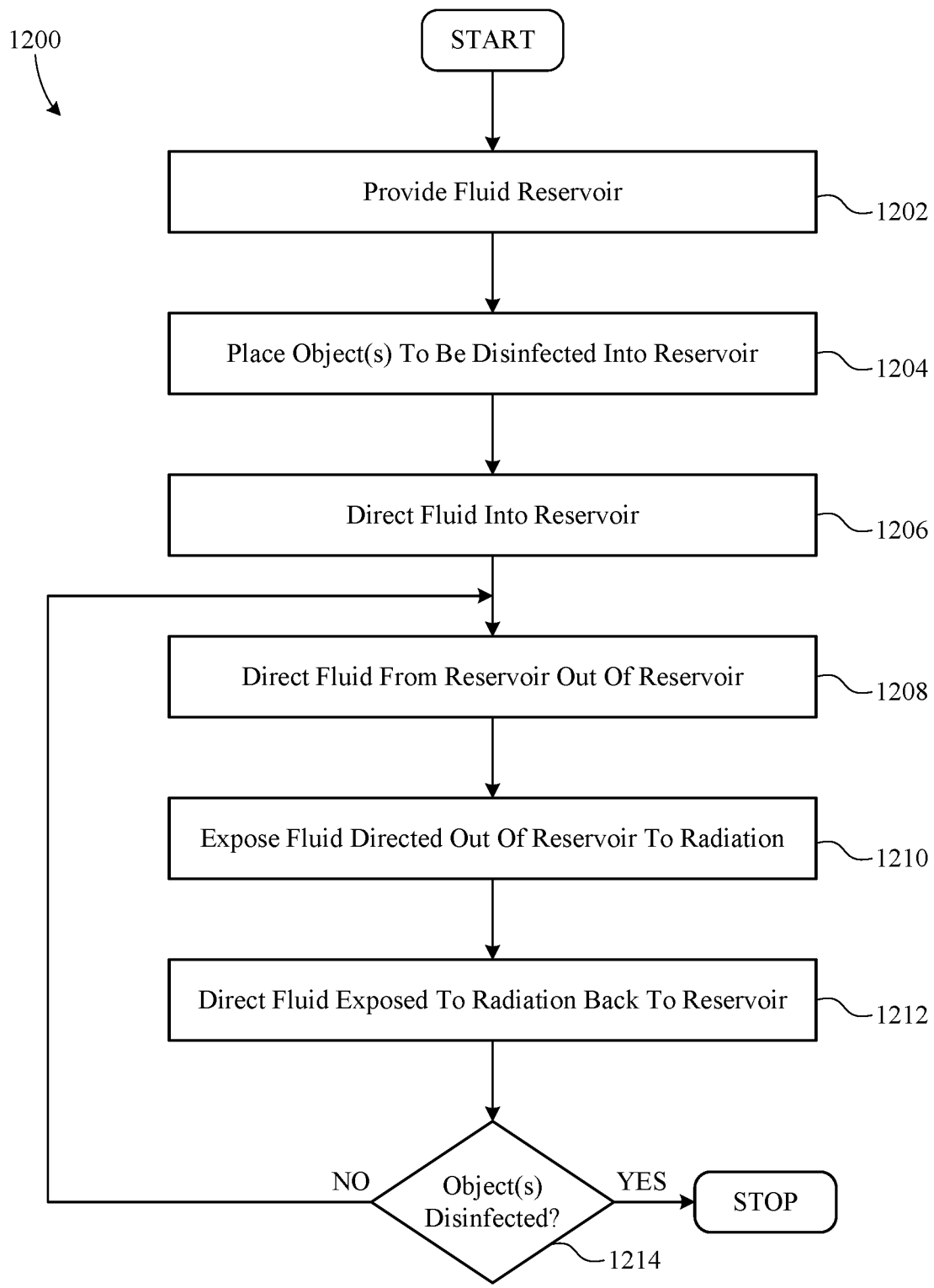
FIG. 12 is a flowchart summarizing an example method for disinfecting objects.

FIG. 12 shows a flowchart 1200 summarizing a method for disinfecting objects. In a first step 1202, a fluid reservoir is provided. Then, in a second step 1204, the objects are placed in the reservoir. Next, in a third step 1206, fluid is directed into to the reservoir. Then, in a fourth step 1208, fluid from the reservoir is directed out of the reservoir. Next, in a fifth step 1210, the fluid directed out of the reservoir is exposed to radiation. Then, in a sixth step 1212, the fluid exposed to radiation is directed back into the reservoir. Finally, in a seventh step 1214, it is decided if the objects are disinfected. If not, steps 1208, 1210, 1212, and 1214 are repeated. If the objects are disinfected, the process ends and object(s) are removed from the reservoir. Determining if the object(s) are disinfected may include, but is not limited to, sampling the chemical state of the water (e.g., PH levels, PPM for a chemical, presence of an additive, etc.), running the process for a predetermined duration of time, running the process for a predetermined number of cycles, etc.

The description of particular embodiments of the present invention is now complete. Many of the described features may be substituted, altered or omitted without departing from the scope of the invention. For example, alternate light sources (e.g., lasers, laser diodes, etc.), may be substituted for the laser diode and/or LED discussed above. As another example, the flow rate of fluids passing through the disinfecting chamber can be adjusted to ensure sufficient exposure time of any pathogens to the ultraviolet light. As another example, the disinfecting chambers described can be utilized in a wide range of systems, dental tools being only one particular example. As another example, a spray chamber can be substituted for the reservoir baths shown in the example embodiments, with multiple spray nozzles directing the working fluid against the objects to be disinfected. These and other deviations from the particular embodiments shown will be apparent to those skilled in the art, particularly in view of the foregoing disclosure.

I claim:

1. A disinfecting system comprising:
a reservoir defining an interior space configured to hold a volume of working fluid and to facilitate an exposure of objects in said interior space to said working fluid;
a first port in fluid communication with said interior space of said reservoir;
a second port in fluid communication with said interior space of said reservoir;
a fluid conduit coupled between said first port and said second port to direct said working fluid along a fluid path, said system being configured to operate in a forward flow state and a reverse flow state;
a pump coupled to said fluid conduit and configured to circulate said working fluid along said fluid path through said fluid conduit and through said reservoir in said forward flow state and said reverse flow state;
an ultraviolet light source configured to irradiate said working fluid as said working fluid traverses a particular section of said fluid conduit;
a first filter assembly including a first filter, said first filter assembly disposed in said fluid path at a first location when said fluid is moving along said fluid path in said forward flow state but not said reverse flow state;
a second filter assembly including a second filter, said second filter assembly disposed in said fluid path at a second location when said fluid is moving along said fluid path in said reverse flow state but not said forward flow state.

2. The disinfecting system of claim 1, further comprising an agitator coupled to at least one of said reservoir and said fluid conduit.

3. The disinfecting system of claim 1, further comprising optics disposed between said ultraviolet light source and said particular section of said fluid conduit.

4. The disinfecting system of claim 1, further comprising an additive dispenser coupled to at least one of said reservoir and said fluid conduit, said additive dispenser being configured to dispense one or more additives into said working fluid.

5. The disinfecting system of claim 4, further comprising a monitor configured to acquire information associated with a current state of said fluid, said additive dispenser being operative to administer one are more additives into said working fluid according to said information acquired by said monitor.

6. The disinfecting system of claim 1, wherein:
said fluid enters said reservoir through said first port and exits said reservoir through said second port when said system is operating in said forward flow state; and
said fluid enters said reservoir through said second port and exits said fluid reservoir through said first port when said system is operating in said reverse flow state.

7. The disinfecting system of claim 6, wherein said pump is a reversible pump configured to pump said fluid in a forward direction when said system is in said forward flow state and to pump said fluid in a reverse direction when said system is in said reverse flow state.

8. The disinfecting system of claim 6, wherein:
said first filter assembly is switchable between an open state and a filtering state, said first filter being disposed in said fluid path when said first filter assembly is in said filtering state, and said first filter being disposed out of said fluid path when said first filter assembly is in said open state, and
said second filter assembly is switchable between said open state and said filtering state, said second filter being disposed in said fluid path when said second filter assembly is in said filtering state, and said second filter being disposed out of said fluid path when said second filter assembly is in said open state.

9. The disinfecting system of claim 8, wherein:
said first filter assembly is disposed between said first port and said pump; and
said second filter assembly is disposed between said second port and said pump.

10. The disinfecting system of claim 9, wherein:
said first port is disposed at a first vertical height; and
said second port is disposed at a second vertical height that is lower than said first vertical height; and whereby
said working fluid flows downwardly through said reservoir in said forward flow direction; and
said working fluid flows upwardly through said reservoir in said reverse flow direction.

11. The disinfecting system of claim 1, further comprising a controller electrically connected to said pump and said light source, said controller being configured to control the operation of said pump and said light source.

12. The disinfecting system of claim 11, further comprising an additive dispenser, and wherein:
    said additive dispenser is coupled to deliver one or more additives to at least one of said reservoir and said fluid conduit;
    said additive dispenser is electrically connected to receive control signals from said controller; and
    said additive dispenser being configured to dispense one or more additives into said working fluid according to said control signals from said controller.

13. The disinfecting system of claim 12, further comprising a monitor, and wherein:
    said monitor is coupled to monitor a current state of said working fluid;
    said monitor is electrically connected to said controller and operative to provide information indicative of said current state of said working fluid to said controller;
    said controller is configured to cause said additive dispenser to administer one or more additives into said working fluid according to said information received from said monitor.

14. The disinfecting system of claim 13, further comprising an agitator coupled to at least one of said reservoir and said fluid conduit, said agitator being electrically connected to receive control signals from said controller.

* * * * *